US012270520B2

(12) United States Patent
Hayashi

(10) Patent No.: US 12,270,520 B2
(45) Date of Patent: Apr. 8, 2025

(54) VEHICLE LAMP

(71) Applicant: Ichikoh Industries, Ltd., Isehara (JP)

(72) Inventor: Masateru Hayashi, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/632,738

(22) PCT Filed: Aug. 4, 2020

(86) PCT No.: PCT/JP2020/029873
§ 371 (c)(1),
(2) Date: Feb. 3, 2022

(87) PCT Pub. No.: WO2021/025028
PCT Pub. Date: Feb. 11, 2021

(65) Prior Publication Data

US 2022/0275923 A1 Sep. 1, 2022

(30) Foreign Application Priority Data

Aug. 7, 2019 (JP) ................................ 2019-145781

(51) Int. Cl.
*F21S 41/36* (2018.01)
*F21S 41/151* (2018.01)
(Continued)

(52) U.S. Cl.
CPC ............ *F21S 41/36* (2018.01); *F21S 41/151* (2018.01); *F21S 41/663* (2018.01); *F21S 41/153* (2018.01);
(Continued)

(58) Field of Classification Search
CPC .................... F21S 41/36; F21S 41/153; F21S 41/151-153; F21S 41/33-36; F21W 2102/10-40
See application file for complete search history.

(56) References Cited

U.S. PATENT DOCUMENTS 8,928,226 B1 * 1/2015 Harrington, Jr. ........ B60Q 1/20 315/192
10,066,799 B2 * 9/2018 Bhakta .................. F21S 41/675
(Continued)

FOREIGN PATENT DOCUMENTS

EP 3 181 991 A1 6/2017
JP 2012164550 A * 8/2012 .............. B60Q 1/18
(Continued)

OTHER PUBLICATIONS

Machine translation of JP 2012164550 A retrieved from the FIT database of PE2E search. (Year: 2023).*
(Continued)

*Primary Examiner* — Colin J Cattanach
(74) *Attorney, Agent, or Firm* — Oblon, McClelland, Maier & Neustadt, L.L.P.

(57) ABSTRACT

A vehicle lamp includes: a plurality of reflectors including a first reflector; and a plurality of light sources provided in the plurality of reflectors in a mode in which at least one of the plurality of light sources is provided in each of the plurality of reflectors, where the plurality of light sources include two or more first light sources provided in the first reflector, a light distribution pattern of light emitted from the plurality of light sources through the plurality of reflectors includes a first pattern in which a width in a vertical direction decreases toward a vehicle outer side, one of the two or more first light sources is disposed at a focal point of the first reflector, and the other of the two or more first light sources is disposed on a vehicle inner side with respect to the focal point of the first reflector.

6 Claims, 20 Drawing Sheets

(51) Int. Cl.

| | |
|---|---|
| ***F21S 41/153*** | (2018.01) |
| ***F21S 41/33*** | (2018.01) |
| ***F21S 41/663*** | (2018.01) |
| ***F21W 102/10*** | (2018.01) |
| ***F21W 102/13*** | (2018.01) |
| ***F21W 102/135*** | (2018.01) |
| ***F21W 102/14*** | (2018.01) |
| ***F21W 102/145*** | (2018.01) |
| ***F21W 102/15*** | (2018.01) |
| ***F21W 102/155*** | (2018.01) |
| ***F21W 102/16*** | (2018.01) |
| ***F21W 102/165*** | (2018.01) |
| ***F21W 102/17*** | (2018.01) |
| ***F21W 102/18*** | (2018.01) |
| ***F21W 102/19*** | (2018.01) |
| ***F21W 102/20*** | (2018.01) |
| ***F21W 102/30*** | (2018.01) |
| ***F21W 102/40*** | (2018.01) |

(52) U.S. Cl.

CPC .............. *F21S 41/33* (2018.01); *F21S 41/331* (2018.01); *F21S 41/332* (2018.01); *F21S 41/333* (2018.01); *F21S 41/334* (2018.01); *F21S 41/335* (2018.01); *F21S 41/336* (2018.01); *F21S 41/337* (2018.01); *F21S 41/338* (2018.01); *F21W 2102/10* (2018.01); *F21W 2102/13* (2018.01); *F21W 2102/135* (2018.01); *F21W 2102/14* (2018.01); *F21W 2102/145* (2018.01); *F21W 2102/15* (2018.01); *F21W 2102/155* (2018.01); *F21W 2102/16* (2018.01); *F21W 2102/165* (2018.01); *F21W 2102/17* (2018.01); *F21W 2102/18* (2018.01); *F21W 2102/19* (2018.01); *F21W 2102/20* (2018.01); *F21W 2102/30* (2018.01); *F21W 2102/40* (2018.01)

(56) References Cited

U.S. PATENT DOCUMENTS

| | | | | |
|---|---|---|---|---|
| 2009/0207625 | A1* | 8/2009 | Konishi ................ | F21S 41/147 362/545 |
| 2010/0232173 | A1* | 9/2010 | Ohno .................... | F21S 41/148 362/538 |
| 2015/0116980 | A1* | 4/2015 | Li ......................... | F21S 41/153 362/235 |
| 2015/0117046 | A1* | 4/2015 | Harrington, Jr. ....... | F21S 41/36 362/517 |
| 2016/0186952 | A1 | 6/2016 | Hogrefe et al. | |
| 2018/0187854 | A1 | 7/2018 | Sato | |

FOREIGN PATENT DOCUMENTS

| | | | | |
|---|---|---|---|---|
| JP | 2012-238451 A | | 12/2012 | |
| JP | 2017224468 A | * | 12/2017 | ............ F21S 41/147 |
| WO | WO 2016/024489 A1 | | 2/2016 | |

OTHER PUBLICATIONS

Machine translation of JP 2017224468 A retrieved from the FIT database of PE2E search. (Year: 2023).*

International Search Report mailed on Sep. 24, 2020 in PCT/JP2020/029873 filed on Aug. 4, 2020 (2 pages).

Japanese Office Action mailed on Nov. 21, 2023, issued in Japanese Patent Application No. 2023-075424 filed on May 1, 2023, with English Translation, total 5 pages.

Chinese Office Action issued in Chinese Patent Application No. 202080055899.0 on Jan. 17, 2024 (w/ English translation).

Extended European Search Report issued in European Patent Application No. 20849712.3 on Aug. 2, 2023.

* cited by examiner

VEHICLE LAMP

TECHNICAL FIELD

The present invention relates to a vehicle lamp.

BACKGROUND ART

There is known a vehicle lamp including a light source including a plurality of semiconductor light emitting elements that can be individually turned on and off, and a reflector having a reflective surface based on a rotating parabolic surface, wherein the reflector includes a plurality of partial reflectors divided in the vertical direction, and the reflective surface of each partial reflector is configured such that the horizontal spread of reflected light on a predetermined projection surface reflected by each partial reflector is substantially equal (see PTL 1, for example).

CITATION LIST

Patent Literature

PTL 1: Pamphlet of International Publication No. 2016/024489

SUMMARY OF THE INVENTION

Problems to be Solved by the Invention

However, in the above-described conventional technology, light in an upper portion on the vehicle outer side of a light distribution pattern is relatively strong, and therefore there is a risk of glare to a driver due to the irradiation of light to a reflection object such as a signboard located on the roadway lateral side.

Therefore, in one aspect, it is an object of the present invention to reduce glare caused by light irradiation to a reflection object such as a signboard located on the roadway lateral side, in a vehicle lamp provided with a plurality of reflectors.

Means for Solving the Problem

According to an aspect, there is provided a vehicle lamp including: a plurality of reflectors including a first reflector; and a plurality of light sources provided in the plurality of reflectors in a mode in which at least one of the plurality of light sources is provided in each of the plurality of reflectors, wherein the plurality of light sources include two or more first light sources provided in the first reflector, a light distribution pattern of light emitted from the plurality of light sources through the plurality of reflectors includes a first pattern in which a width in a vertical direction decreases toward a vehicle outer side, one of the two or more first light sources is disposed at a focal point of the first reflector, and the other of the two or more first light sources is disposed on a vehicle inner side with respect to the focal point of the first reflector.

Effect of the Invention

In the aspect, according to the present invention, it is possible to reduce glare caused by light irradiation to a reflection object such as a signboard located on the roadway lateral side, in a vehicle lamp provided with a plurality of reflectors.

BRIEF DESCRIPTION OF THE DRAWINGS

FIG. 15A is a diagram illustrating a light distribution pattern in a case where all the light sources are turned on.

FIG. 15B is a diagram illustrating a light distribution pattern in a case where some of the light sources are turned on.

FIG. 15C is a diagram illustrating a light distribution pattern in a case where some of the light sources are turned on.

FIG. 15D is a diagram illustrating a light distribution pattern in a case where some of the other light sources are turned on.

FIG. 15E is a diagram illustrating a light distribution pattern in a case where some of the other light sources are turned on.

MODE FOR CARRYING OUT THE INVENTION

Figure 1:
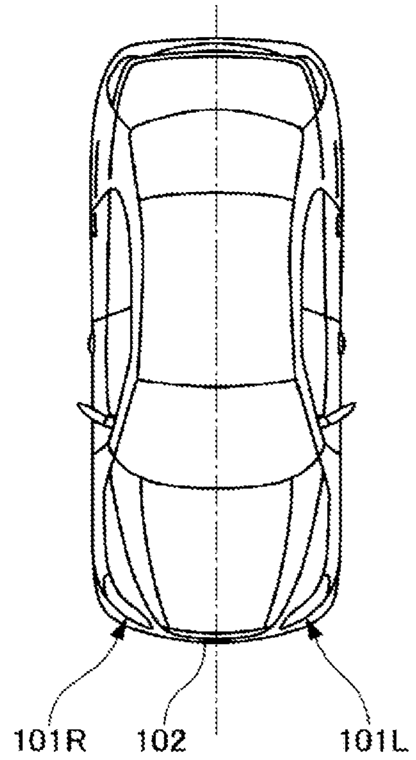
FIG. 1 is a plan view of a vehicle provided with vehicle lamps of this embodiment.

Hereinafter, each embodiment will be described in detail with reference to the accompanying drawings. In the accompanying drawings, for the sake of clarity, only some of a plurality of portions having the same attribute may be denoted by reference numerals. Hereinafter, unless otherwise specified, “front” and “rear” indicate the “forward traveling direction” and the “backward traveling direction” of a vehicle, respectively, and “up”, “down”, “left”, and “right” indicate the directions as seen by a driver who gets on a vehicle, respectively. Note that “up” and “down” are also “up” and “down” in the vertical direction, and “left” and “right” are also “left” and “right” in the horizontal direction. The vehicle outer side refers to the outer side of the vehicle in the left-right direction with respect to the front-rear axis of the vehicle that passes through the center of the vehicle in the left-right direction, and the vehicle inner side refers to the side closer to the front-rear axis in the left-right direction of the vehicle.

First Embodiment

FIG. 1 is a plan view of a vehicle 102 provided with vehicle lamps (vehicle headlights) of this embodiment as a first embodiment.

As illustrated in FIG. 1, the vehicle lamps of this embodiment are respective vehicle headlights (101L, 101R) provided on the left and right sides of the front side of the vehicle 102, and will be hereinafter simply referred to as vehicle lamps.

Each of the vehicle lamps in this embodiment includes a housing (not illustrated) with an opening on the front side of the vehicle and an outer lens (not illustrated) attached to the housing so as to cover the opening, and a lamp unit 1 (see FIG. 2) and the like are disposed in a lamp chamber formed by the housing and the outer lens.

Hereinafter, the lamp unit 1 of the right headlight 101R will be described with reference to FIG. 2 and subsequent drawings. Unless otherwise mentioned, the same may be described for the lamp unit 1 of the left headlight 101L. For example, the lamp unit 1 of the left headlight 101L has a symmetrical configuration with respect to the lamp unit 1 of the right headlight 101R.

Figure 2:
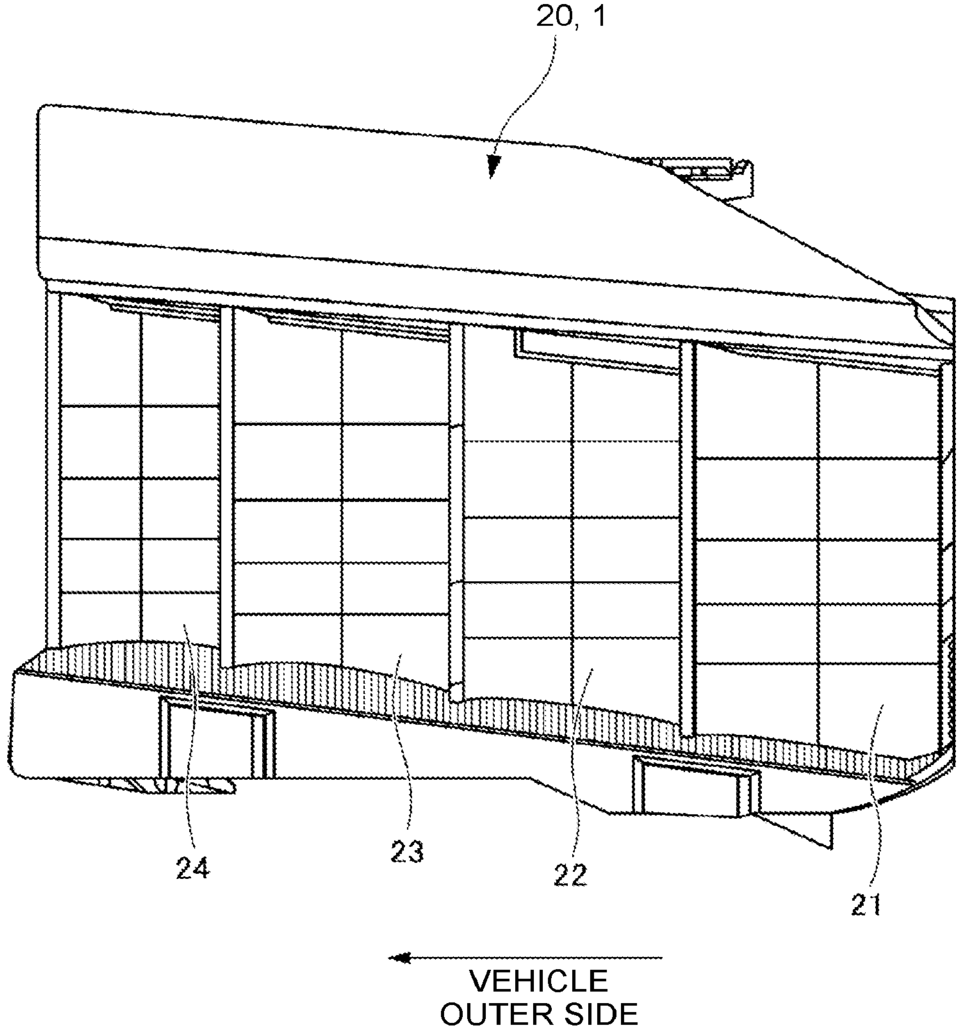
FIG. 2 is a front view for illustrating a reflector assembly of a lamp unit of an embodiment.

FIG. 2 is a front view for illustrating a reflector assembly 20 of the lamp unit 1 of an embodiment.

The lamp unit 1 is an ADB (Adaptive Driving Beam) or high beam, and includes the reflector assembly 20. The reflector assembly 20 includes four reflectors 21 to 24 aligned in the vehicle width direction.

The first reflector 22 is located on the vehicle outer side with respect to the second reflector 21. The second reflector 21 is located on the vehicle innermost side among the four reflectors 21 to 24, and the third reflector 23 is located on the vehicle outer side with respect to the first reflector 22. The fourth reflector 24 is located on the vehicle outer side with respect to the third reflector 23, and is located on the vehicle outermost side among the four reflectors 21 to 24.

The first reflector 22 is located on the vehicle rear side with respect to the second reflector 21. The second reflector 21 is located on the vehicle foremost side among the four reflectors 21 to 24, and the third reflector 23 is located on the vehicle rear side with respect to the first reflector 22. The fourth reflector 24 is located on the vehicle rear side with respect to the third reflector 23, and is located on the vehicle rearmost side among the four reflectors 21 to 24.

Figure 3:
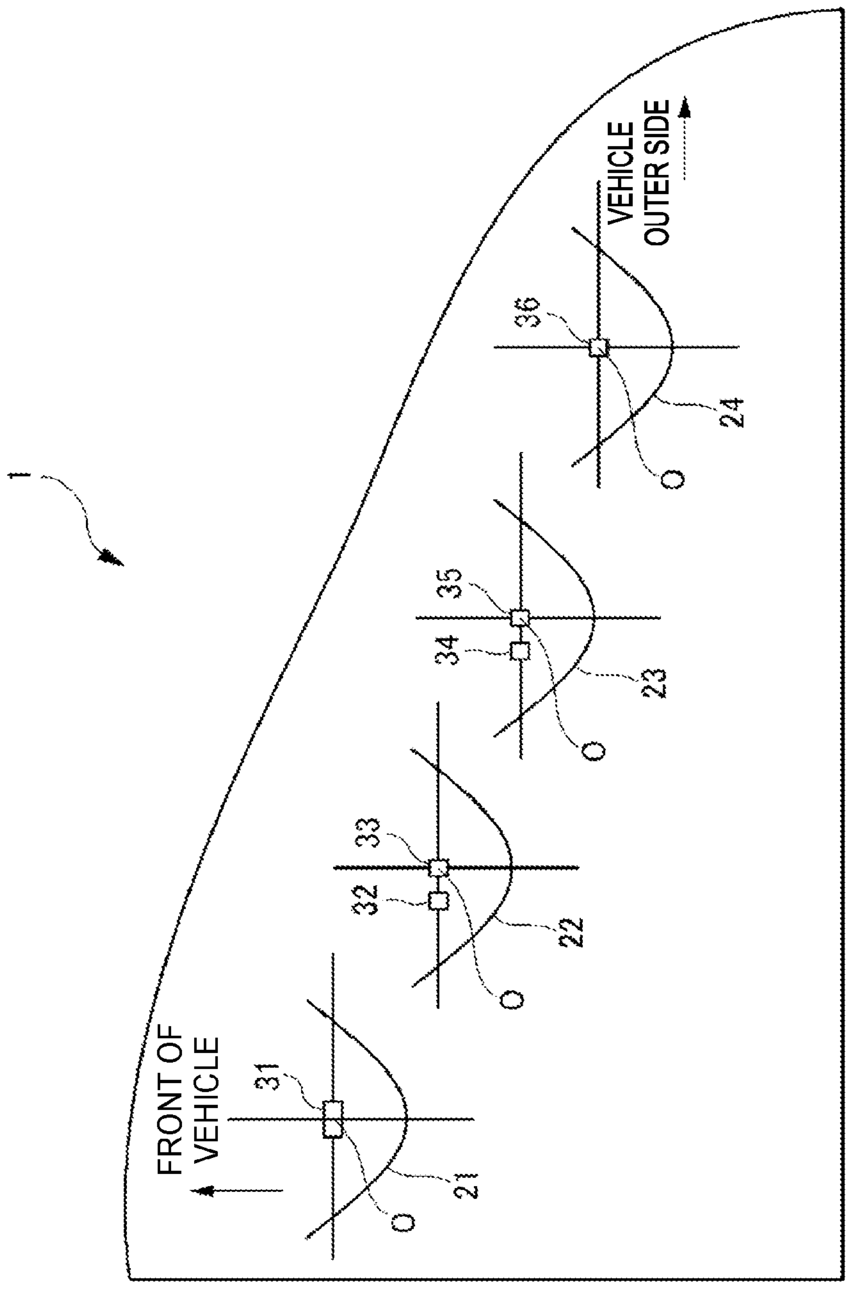
FIG. 3 is a top view illustrating relationship between reflectors and light sources of the lamp unit.

FIG. 3 is a top view illustrating relationship between the reflectors 21 to 24 and light sources 31 to 36 of the lamp unit 1. In FIG. 3, the outline of the reflectors 21 to 24 is schematically illustrated, and respective focal points of the reflectors 21 to 24 are illustrated by respective intersections O of cross hairs.

The reflectors 21 to 24 are provided with the light sources 31 to 36. The light sources 31 to 36 are formed of LEDs (Light Emitting Diodes). The reflectors 21 to 24 form a traveling light distribution area in front of the vehicle on the basis of light from the light sources 31 to 36.

The first light sources 32 and 33 are provided in the first reflector 22. The first light sources 32 and 33 are disposed on the left and right side by side, respectively, and the first light source 32 is disposed on the vehicle inner side with respect to the first light source 33. The first light source 33 is disposed at the focal point of the first reflector 22. Note that the concept of “the first light source 33 is disposed at the focal point of the first reflector 22” includes not only a mode in which the center position (center of a chip) of the first light source 33 coincides with the focal point of the first reflector 22 but also a mode in which a chip pertaining to the first light source 33 is located on the focal point of the first reflector 22. This is substantially the same as the relationship between the light sources and the reflectors other than the first light source 33 and the first reflector 22.

The third light sources 34 and 35 are provided in the third reflector 23. The third light sources 34 and 35 are disposed on the left and right side by side, respectively, and the third light source 34 is disposed on the vehicle inner side with respect to the third light source 35. The third light source 35 is disposed at the focal point of the third reflector 23.

The second light source 31 is in the form of a single chip integrally mounted with two LED devices, and is provided in the second reflector 21. As illustrated in FIG. 3, the second light source 31 is disposed at the focal point of the second reflector 21 in such a mode that the light-emitting chips are adjacent to each other. Note that the concept of “the second light source 31 is disposed at the focal point of the second reflector 21” includes not only a mode in which the center position (center between the two LED devices, namely the center of a chip pertaining to the second light source 31) of the second light source 31 coincides with the focal point of the second reflector 21 but also a mode in which the chip pertaining to the second light source 31 is located on the focal point of the second reflector 21.

The fourth light source 36 is provided in the fourth reflector 24. The fourth light source 36 is disposed at the focal point of the fourth reflector 24.

Figure 4:
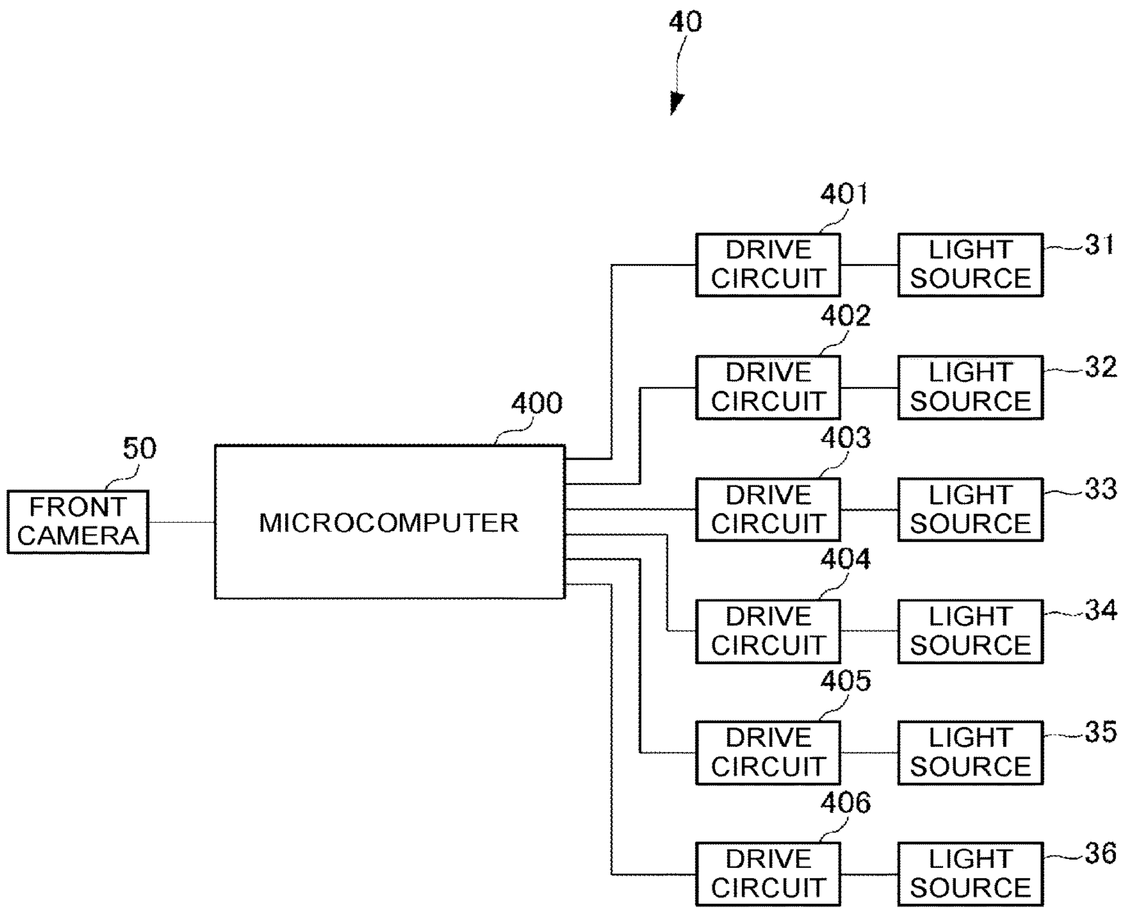
FIG. 4 is a system diagram schematically illustrating a control system according to the light sources of the lamp unit.

FIG. 4 is a system diagram schematically illustrating a control system 40 for the light sources 31 to 36 of the lamp unit 1.

The control system 40 is electrically connected to the light sources 31 to 36 so as to enable individual control of the light sources 31 to 36. In FIG. 4, the control system 40 includes a microcomputer 400 (referred to as a “microcomputer” in FIG. 4) and drive circuits 401 to 406. The microcomputer 400 and the drive circuits 401 to 406 may be embodied as, for example, an ECU (Electronic Control Unit).

The drive circuit 401 drives the second light source 31 in response to a command from the microcomputer 400. The drive circuit 402 drives the first light source 32 in response to a command from the microcomputer 400. Hereinafter, in the same manner, the drive circuits 403 to 406 drive the light sources 33 to 36, respectively, in response to respective commands from the microcomputer 400. Note that a driving method is pulse driving, and each of the light sources 31 to 36 is individually controlled, for example, in a mode in which the duty ratio of the pulse driving is variable.

The microcomputer 400 realizes variable light distribution control such as ADB. The microcomputer 400 controls the light sources 31 to 36 such that a light distribution pattern that does not cause glare to a driver of an oncoming vehicle or the like is realized on the basis of an image captured from a front camera 50 that captures an image in front of the vehicle. In this case, variable light distribution control can be realized without using mechanical moving parts.

In this embodiment, the four reflectors 21 to 24 are provided, and therefore a variety of light distribution patterns can be realized. For example, various light distribution patterns can be realized by changing the reflector to be used (i.e., the light source to be turned on among the light sources 31 to 36) among the four reflectors 21 to 24 (see FIG. 15A to FIG. 15E below). In addition, in this embodiment, the brightness (luminous flux) of light sources 31 to 36 can be varied by varying the duty ratio of a drive current, and therefore the brightness of the light sources 31 to 36 can be individually controlled to achieve various light distribution patterns.

Also, in this embodiment, since the first reflectors 22 and 23 each include the two light sources in one reflector (for example, the first light sources 32 and 33 for the first reflector 22), and therefore various light distribution patterns can be realized by changing the light sources to be used.

Now, the light distribution pattern of the lamp unit 1 of the right headlight 101R will be described with reference to FIG. 5 and the subsequent drawings.

Figure 5:
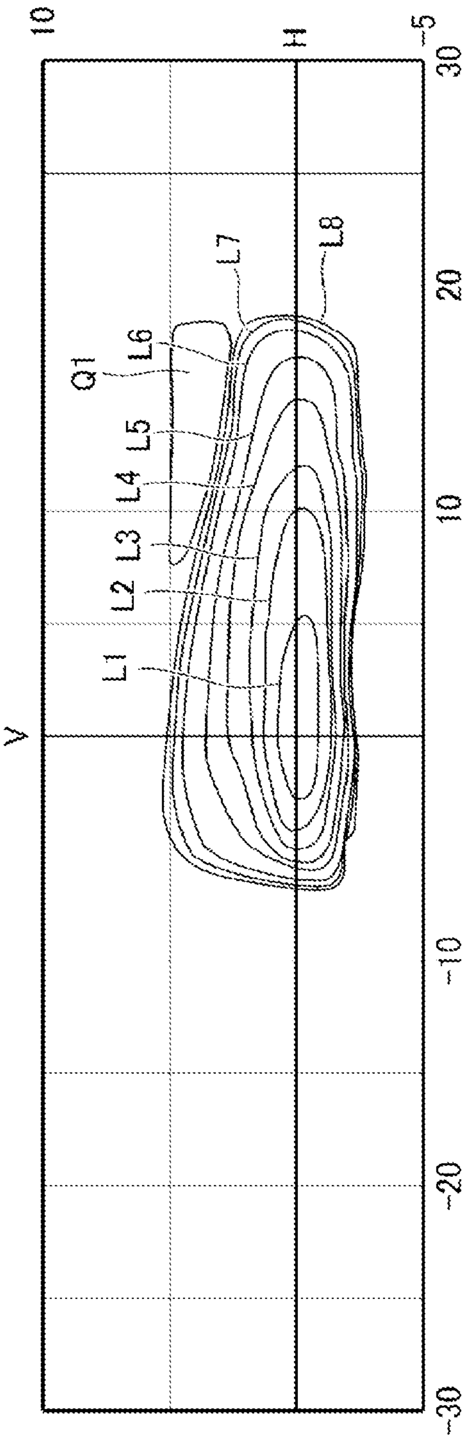
FIG. 5 is an explanatory diagram of an example of a light distribution pattern of the lamp unit.
Figure 6:
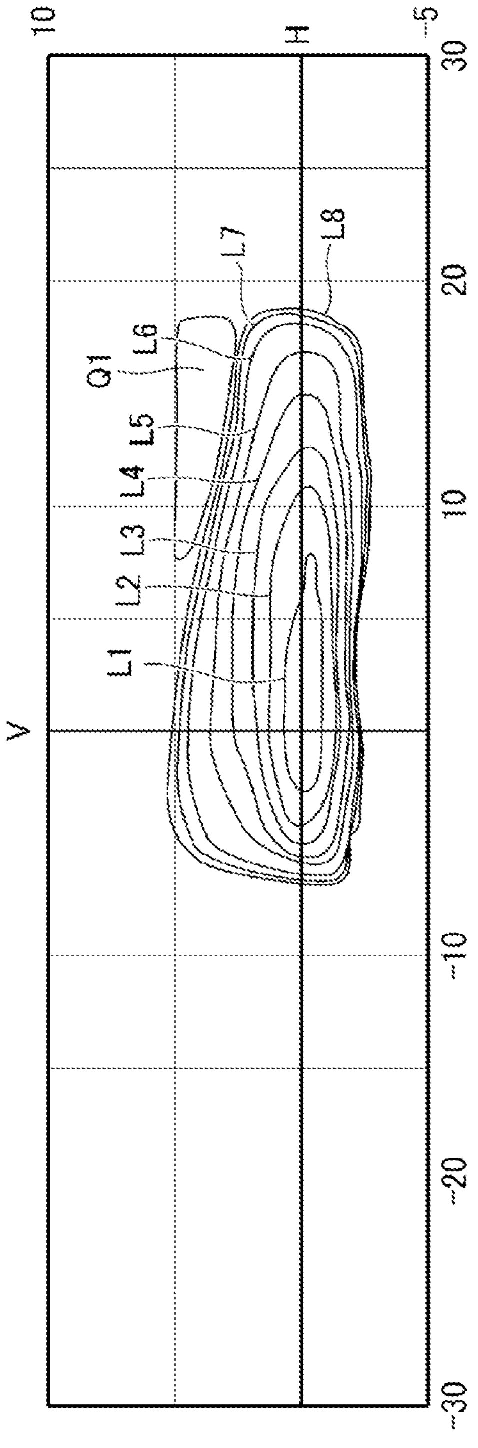
FIG. 6 is an explanatory diagram of another example of the light distribution pattern of the lamp unit.

FIG. 5 and FIG. 6 are diagrams each schematically illustrating, as a light distribution pattern of the lamp unit 1, the distribution of the luminous intensity (cross-sectional luminous intensity) on a plane (screen) perpendicular to the optical axis of the lamp unit 1 in front of the vehicle. Note that in FIG. 5 and FIG. 6 (as well as in the similar figures below), a line V indicates a vertical reference line (V-V line) on the screen, and a line H indicates a horizontal reference line (H-H line) on the screen. In FIG. 5 and FIG. 6, contour lines L1 to L8 of the luminous intensity are illustrated. The luminous intensity has the relationship of L1>L2>L3>L4>L5>L6>L7>L8, and an area surrounded by the contour line L1 is a so-called "hot zone". For example, the contour line L8 is a line of 625 [cd], for example, and the contour line L1 is a line of 50000 [cd]. In the following, description related to the light distribution pattern is description related to a pattern expressed by the luminous intensity as illustrated in FIG. 5 and FIG. 6.

FIG. 5 illustrates a light distribution pattern obtained when the light sources 31 to 36 are driven at the following duty ratios.

First light source 32 Duty ratio 60%
First light source 33 Duty ratio 80%
Third light source 34 Duty ratio 60%
Third light source 35 Duty ratio 80%
Second light source 31 Duty ratio 100%
Fourth light source 36 Duty ratio 60%

FIG. 6 illustrates a light distribution pattern obtained when the light sources 31 to 36 are driven at the following duty ratios.

First light source 32 Duty ratio 80%
First light source 33 Duty ratio 80%
Third light source 34 Duty ratio 80%
Third light source 35 Duty ratio 80%
Second light source 31 Duty ratio 100%
Fourth light source 36 Duty ratio 80%

The light distribution pattern illustrated in each of FIG. 5 and FIG. 6 is realized, for example, in a state in which an oncoming vehicle is not detected, and referred to as a "normal pattern".

In this embodiment, the normal pattern is a form in which the width in the vertical direction decreases toward the vehicle outer side, as illustrated in FIG. 5 and FIG. 6. Such a light distribution pattern is hereinafter also referred to as a "light distribution pattern in which the vertical width is reduced on the vehicle outer side.

In the normal pattern as described in the above PTL 1, glare to a driver may occur due to irradiation of light to a reflection object such as a signboard located on the roadway lateral side because light in an upper portion on the vehicle outer side is relatively strong as described above.

In this respect, according to this embodiment, in the normal pattern, the light in the upper portion on the vehicle outer side is relatively weak (is on the outer side with respect to the contour line L8) as illustrated in a Q1 section in each of FIG. 5 and FIG. 6, and therefore it is possible to reduce an inconvenience (glare to the driver) caused by the irradiation of the light to the reflective objects such as the signboard located on the roadway lateral side. In particular, a signboard located at a position close to the vehicle tends to be located in the Q1 section, and according to this embodiment, it is possible to effectively reduce glare caused by reflected light from such a signboard.

According to this embodiment, as illustrated in FIG. 5 and FIG. 6, while an area with the highest luminous intensity (the "hot zone", which is a condensing portion) is formed at an intersection of the line V and the line H, it is possible to realize a light distribution pattern in which the vertical width is reduced on the vehicle outer side.

Note that in the normal pattern illustrated in FIG. 6, compared to the normal pattern illustrated in FIG. 5, the area with the highest luminous intensity ("hot zone") tends to move to the vehicle outer side (i.e., tend to spread outward from the line V or to move away from the line V). Therefore, in this respect, the normal pattern illustrated in FIG. 5 is more advantageous than the normal pattern illustrated in FIG. 6 In addition, the duty ratio when driving the first light source 32 and the like is smaller, and therefore the normal pattern illustrated in FIG. 5 is more advantageous in terms of power consumption than the normal pattern illustrated in FIG. 6.

Thus, in this embodiment, the first light source 32 is preferably caused to emit light having a lower luminous flux than the first light source 33, the third light source 34 is caused to emit light having a lower luminous flux than the third light source 35 or light having a luminous flux equivalent to that of the first light source 32. In FIG. 5, the first light source 33 is driven at a duty ratio of 80% and the first light source 32 is driven at a duty ratio of 60%, so that the luminous flux of the first light source 32 is lower than that of the first light source 33, but is not limited to this. For example, the first light source 33 may be driven at a duty ratio of 90% and the first light source 32 may be driven at a duty ratio of 70%. A specific value of the duty ratio is an adaptive value. This is also true of the relationship between the third light source 34 and the third light source 35.

A method of making the luminous flux of the first light source 32 lower than that of the first light source 33 may be a method other than a method for setting a difference in the duty ratio. For example, a difference may be set in rated output itself between the first light source 32 and the first light source 33. This is also true of the relationship between the third light source 34 and the third light source 35.

Now, individual light distribution patterns that realize the light distribution pattern illustrated in FIG. 5 will be described with reference to FIG. 7 and the subsequent drawings.

Figure 7:
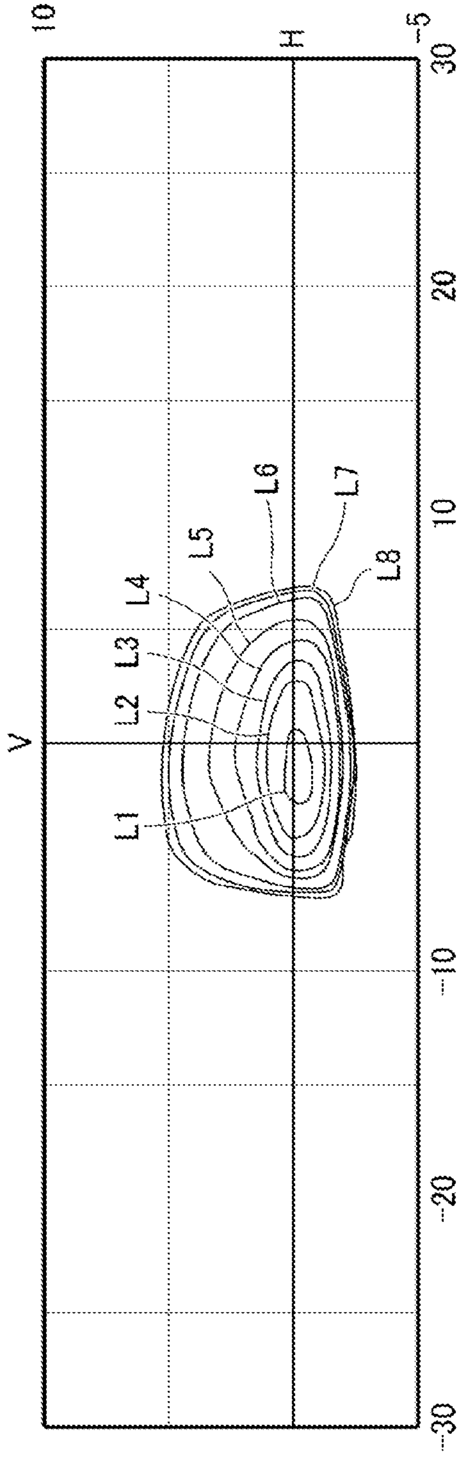
FIG. 7 is a diagram illustrating a light distribution pattern realized by the second reflector 21 and the second light source 31.
Figure 8:
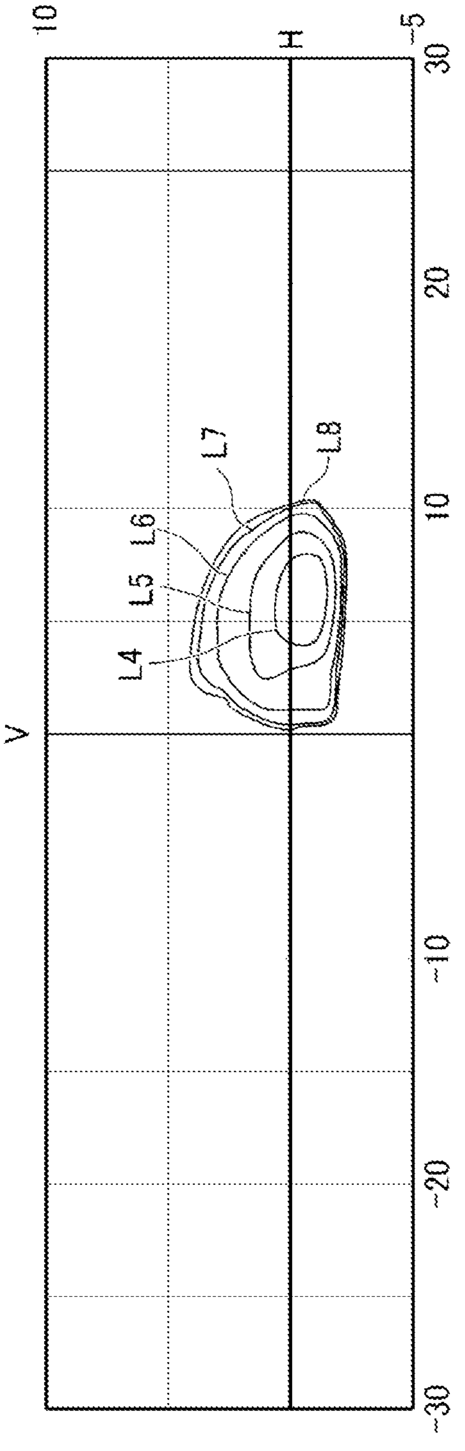
FIG. 8 is a diagram illustrating a light distribution pattern realized by the first reflector 22 and the first light source 32.
Figure 9:
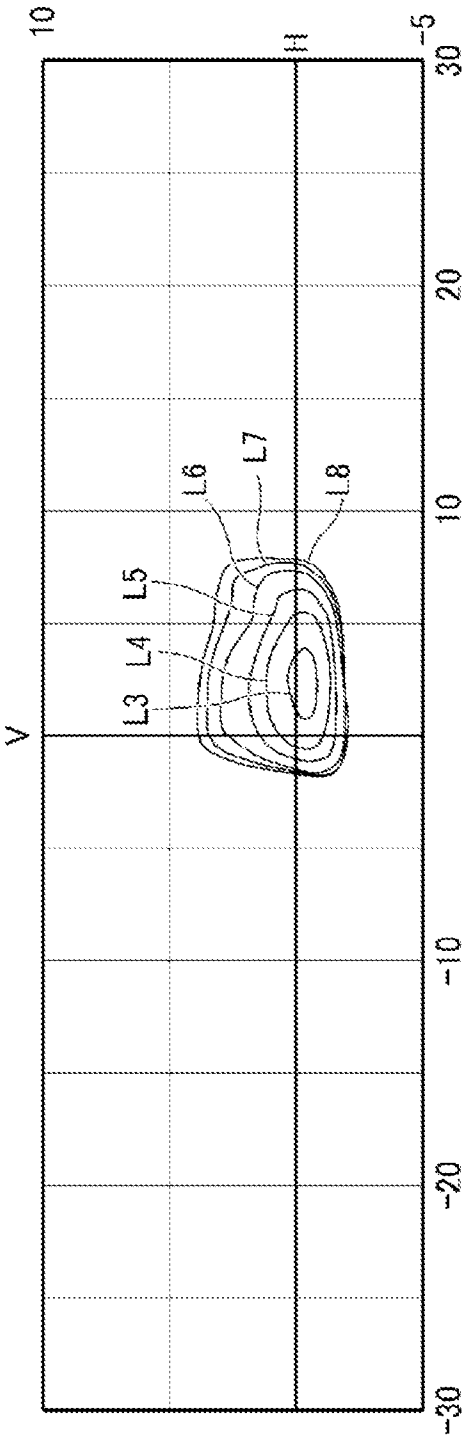
FIG. 9 is a diagram illustrating a light distribution pattern realized by the first reflector 22 and the first light source 33.
Figure 10:
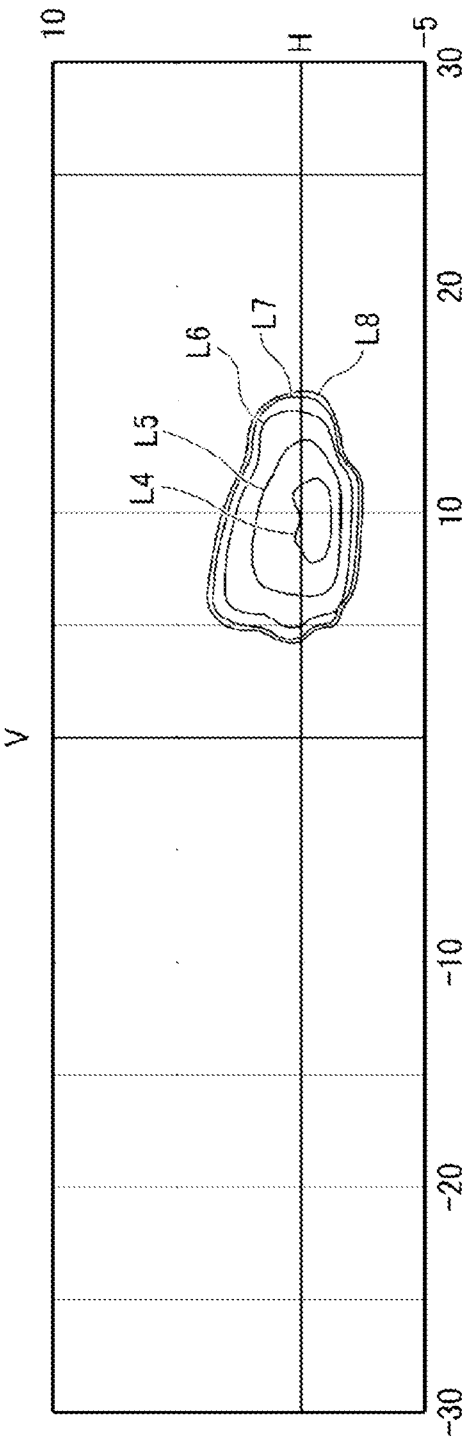
FIG. 10 is a diagram illustrating a light distribution pattern realized by the third reflector 23 and the third light source 34.
Figure 11:
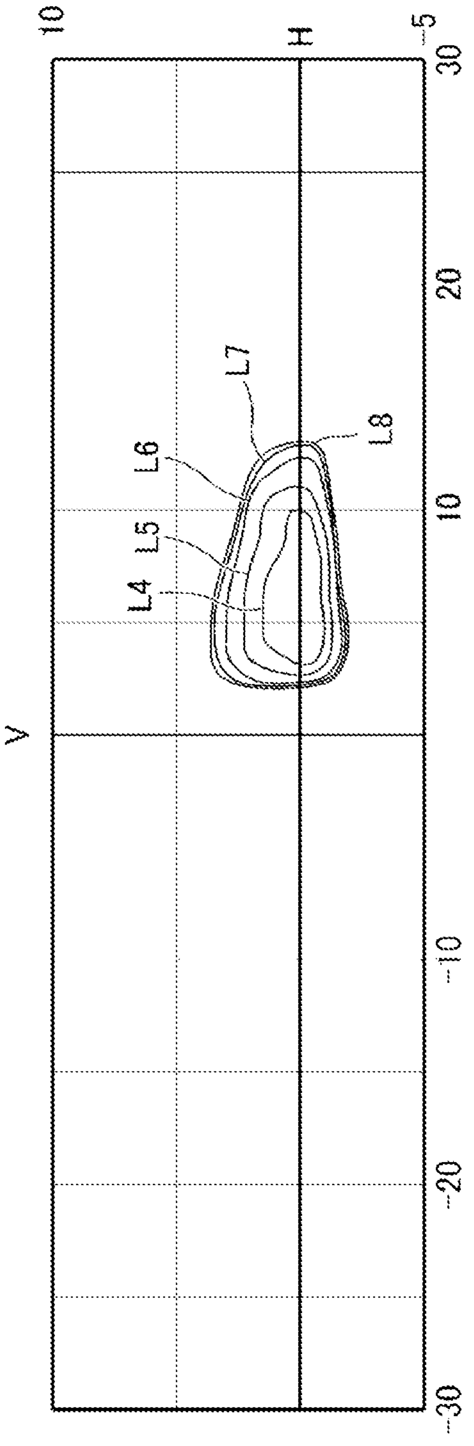
FIG. 11 is a diagram illustrating a light distribution pattern realized by the third reflector 23 and the third light source 35.
Figure 12:
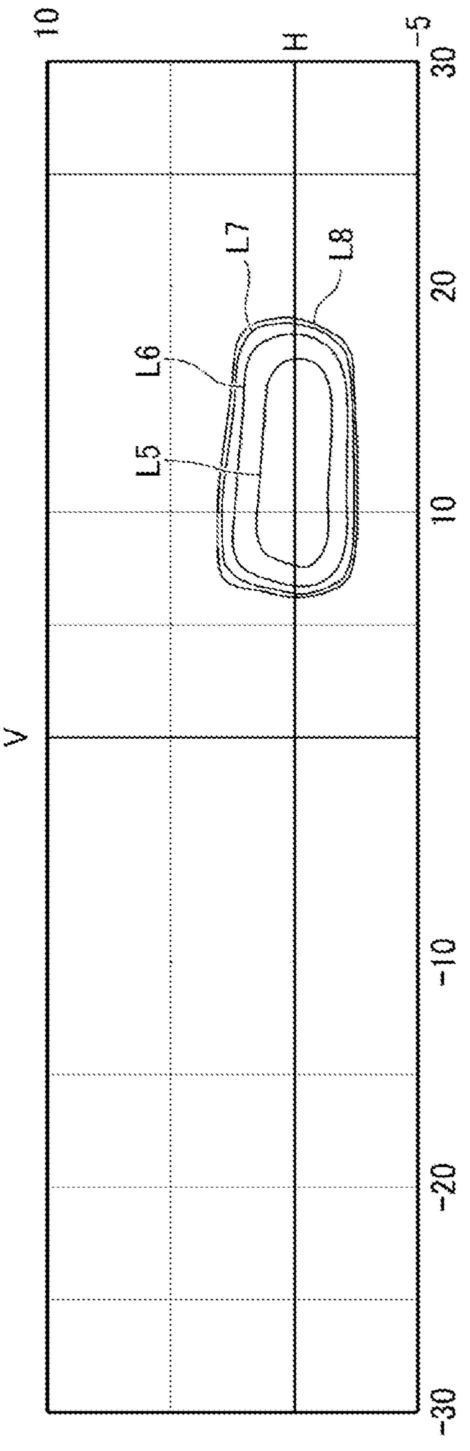
FIG. 12 is a diagram illustrating a light distribution pattern realized by the fourth reflector 24 and the fourth light source 36.

FIG. 7 is a diagram illustrating a light distribution pattern realized by the second reflector 21 and the second light source 31, FIG. 8 is a diagram illustrating a light distribution pattern realized by the first reflector 22 and the first light source 32, FIG. 9 is a diagram illustrating a light distribution pattern realized by the first reflector 22 and the first light source 33, and FIG. 10 is a diagram illustrating a light distribution pattern realized by the third reflector 23 and the third light source 34, FIG. 11 is a diagram illustrating a light distribution pattern realized by the third reflector 23 and the third light source 35, and FIG. 12 is a diagram illustrating a light distribution pattern realized by the fourth reflector 24 and the fourth light source 36. The lines V and H and the contour lines L1 to L8 are described above.

As illustrated in FIG. 7, in the light distribution pattern realized by the second reflector 21 and the second light source 31, a condensing portion pertaining to the contour line L1 is formed at an intersection of the line V and the line H. Consequently, in the normal pattern, the area with the highest luminous intensity ("hot zone") can be effectively formed at the intersection of the line V and the line H by the second reflector 21 and the second light source 31.

As illustrated in FIG. 8 and FIG. 9, the light distribution pattern realized by the first reflector 22 and the first light source 32 is different from the light distribution pattern realized by the first reflector 22 and the first light source 33 in that there is no condensing portion pertaining to the contour line L3. In addition, the light distribution pattern realized by the first reflector 22 and the first light source 32 is in a form in which the vehicle outer side is covered, compared to the light distribution pattern realized by the first reflector 22 and the first light source 33.

More specifically, the first light source 33 is disposed at the focal point of the first reflector 22, as described above, and therefore it is possible to effectively form the condensing portion pertaining to the contour line L3. The condensing portion pertaining to the contour line L3 caused by the first light source 33 is adjacent to a condensing portion pertaining to the contour line L1 in the light distribution pattern realized by the second reflector 21 and the second light source 31 illustrated in FIG. 7, from the vehicle outer side. Consequently, it is possible to effectively form the "hot zone" in the normal pattern illustrated in FIG. 5.

As illustrated in FIG. 9, the light distribution pattern realized by the first reflector 22 and the first light source 33 is different from the light distribution pattern realized by the second reflector 21 and the second light source 31 (see FIG. 7) in that there is no condensing portion pertaining to the contour line L1. This is because the second light source 31 is composed of two LED chips and the first light source 33 composed of one LED chip has a lower luminous flux than the second light source 31.

The first light source 32 is disposed on the vehicle inner side with respect to the first light source 33, as described above. In other words, the first light source 32 is disposed significantly on the vehicle inner side with respect to the focal point of the first reflector 22. Consequently, it is possible to efficiently realize diffusion of light to the vehicle outer side.

In addition, the light distribution pattern realized by the first reflector 22 and the first light source 32 is a form in which the width in the vertical direction reduces toward the vehicle outer side, as illustrated in FIG. 8. Consequently, it is possible to effectively realize the light distribution pattern in which the vertical width is reduced on the above vehicle outer side.

As illustrated in each of FIG. 10 and FIG. 11, in the light distribution pattern realized by the third reflector 23 and the third light source 34, the condensing portion pertaining to the contour line L4 is located on the vehicle outer side, compared to the light distribution pattern realized by the third reflector 23 and the third light source 35. In other words, the light distribution pattern realized by the third reflector 23 and the third light source 34 is in a form in which the vehicle outer side is covered, compared to the light distribution pattern realized by the third reflector 23 and the third light source 35.

More specifically, the third light source 35 is disposed at the focal point of the third reflector 23, as described above, and therefore it is possible to effectively form the condensing portion pertaining to the contour line L4. The condensing portion pertaining to the contour line L4 caused by the third light source 35 is adjacent to the condensing portion pertaining to the contour line L3 in the light distribution pattern realized by the first reflector 22 and the first light source 33 illustrated in FIG. 9, from the vehicle outer side.

Note that the light distribution pattern realized by the third reflector 23 and the third light source 35 is different from the light distribution pattern realized by the first reflector 22 and the first light source 33 (see FIG. 9) in that there is no condensing portion pertaining to the contour line L3, as illustrated in FIG. 11. Consequently, the area with the highest luminous intensity can be inhibited from relatively widely extending up to the vehicle outer side.

The third light source 34 is disposed on the vehicle inner side with respect to the third light source 35, as described above. In other words, the third light source 34 is disposed significantly on the vehicle inner side with respect to the focal point of the third reflector 23. Consequently, it is possible to efficiently realize diffusion of light to the vehicle outer side.

In addition, the light distribution pattern realized by the third reflector 23 and the third light source 34 is in a form in which the width in the vertical direction decreases toward the vehicle outer side, as illustrated in FIG. 10. Consequently, it is possible to effectively realize the light distribution pattern in which the vertical width is reduced on the above vehicle outer side.

As illustrated in FIG. 12, the light distribution pattern realized by the fourth reflector 24 and the fourth light source 36 is different from the light distribution pattern realized by the third reflector 23 and the third light source 34 (see FIG. 10) in that there is no condensing portion pertaining to the contour line L4. Consequently, the area with the highest luminous intensity can be inhibited from relatively widely extending up to the vehicle outer side, while widening the normal pattern up to the vehicle outer side.

Figure 13A:
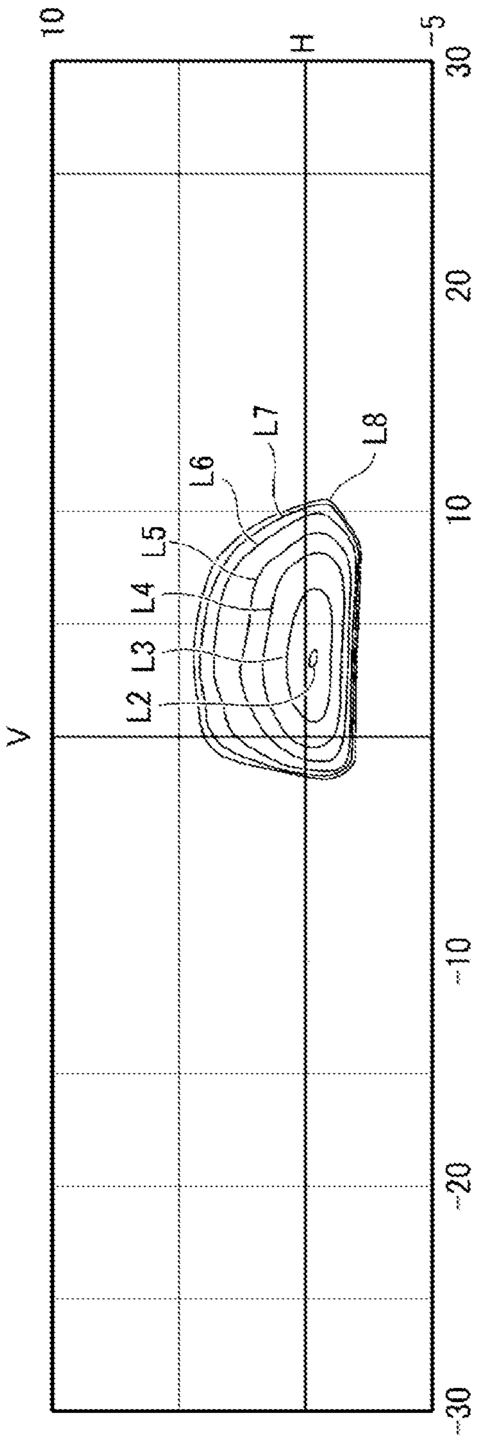
FIG. 13A is an explanatory diagram of an example of a light distribution pattern realized by the first reflector 22 and the first light sources 32 and 33.
Figure 13B:
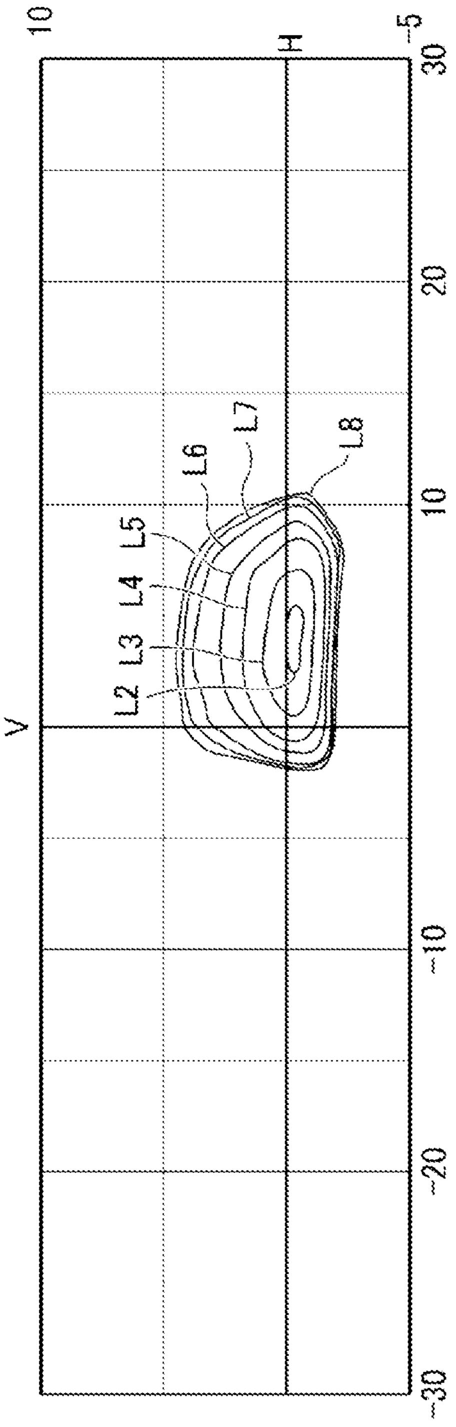
FIG. 13B is an explanatory diagram of another example of the light distribution pattern realized by the first reflector 22 and the first light sources 32 and 33.
Figure 14A:
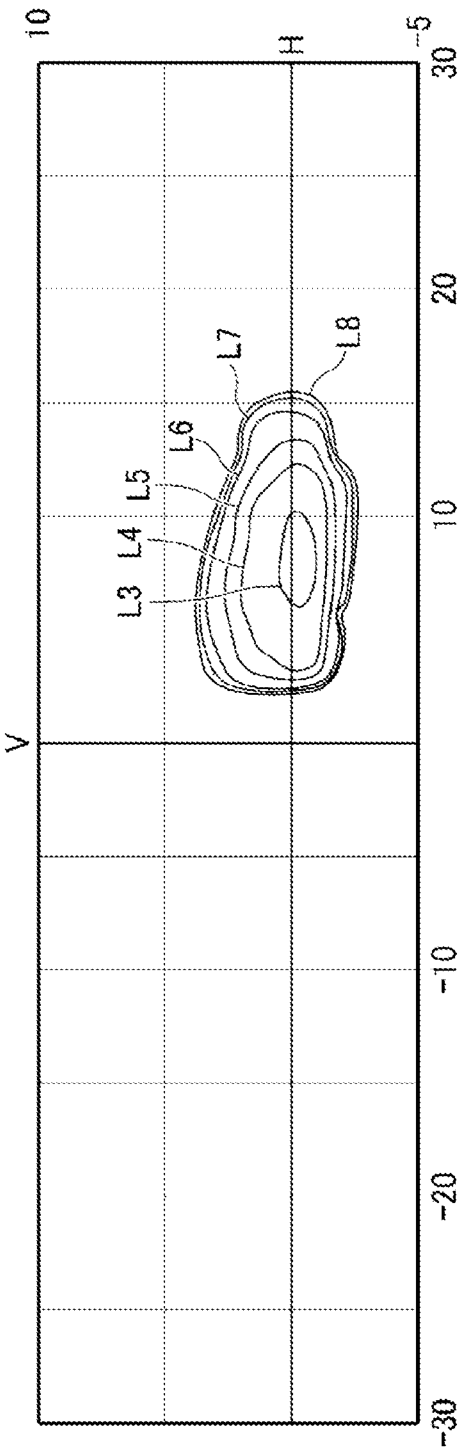
FIG. 14A is an explanatory diagram of an example of a light distribution pattern realized by the third reflector 23 and the third light sources 34 and 35.
Figure 14B:
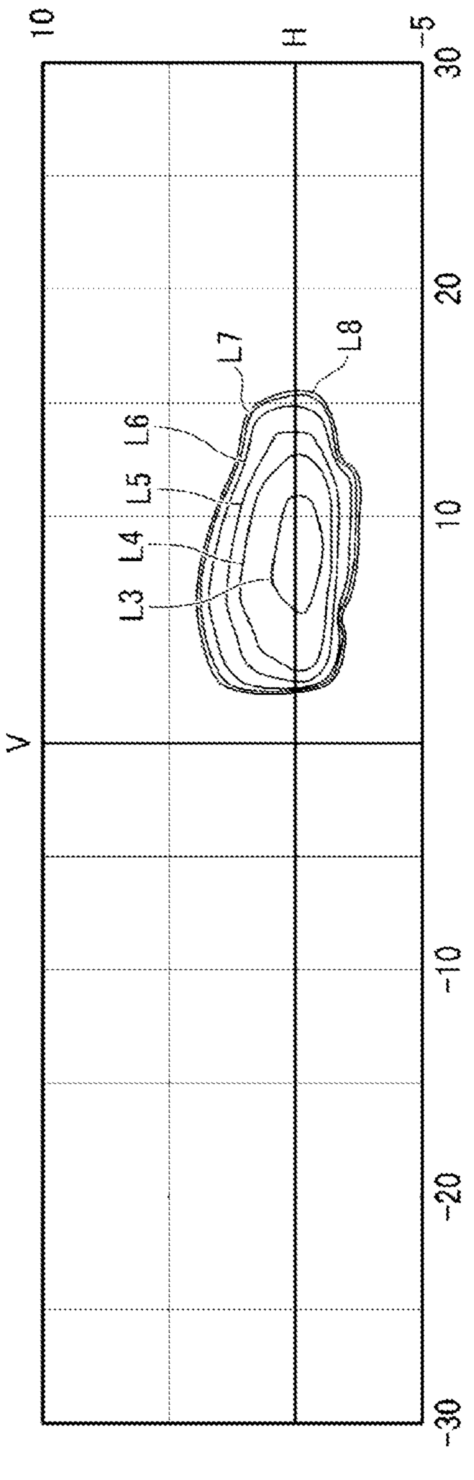
FIG. 14B is an explanatory diagram of another example of the light distribution pattern realized by the third reflector 23 and the third light sources 34 and 35.

FIG. 13A and FIG. 13B are diagrams each illustrating a light distribution pattern realized by the first reflector 22 and the first light sources 32 and 33, and FIG. 14A and FIG. 14B are diagrams each illustrating a light distribution pattern realized by the third reflector 23 and the third light sources 34 and 35. FIG. 13A illustrates a case where the duty ratio of the first light source 32 is 60% and the duty ratio of the first light source 33 is 80%, and FIG. 13B illustrates a case where the duty ratio of the first light source 32 is 80% and the duty ratio of the first light source 33 is 80%. Similarly, FIG. 14A illustrates a case where the duty ratio of the third light source 34 is 60% and the duty ratio of the third light source 35 is 80%, and FIG. 14B illustrates a case where the duty ratio of the third light source 34 is 80% and the duty ratio of the third light source 35 is 80%.

As can be seen by contrasting FIG. 13A and FIG. 13B, the luminous flux of the first light source 32 is made lower than that of the first light source 33, so that it is possible to suppress the spread of the condensing portion pertaining to the contour line L2 to the vehicle outer side. Similarly, as can be seen by contrasting FIG. 14A and FIG. 14B, the luminous flux of the third light source 34 is made lower than that of the third light source 35, so that it is possible to suppress the spread of the condensing portion pertaining to the contour line L3 to the vehicle outer side. Consequently, it is possible to realize a difference between the normal pattern illustrated in FIG. 5 and the normal pattern illustrated in FIG. 6 described above.

Now, some of the various light distribution patterns that can be realized by the lamp unit 1 will be described below with reference to FIG. 15A to FIG. 15E.

Figure 15A:
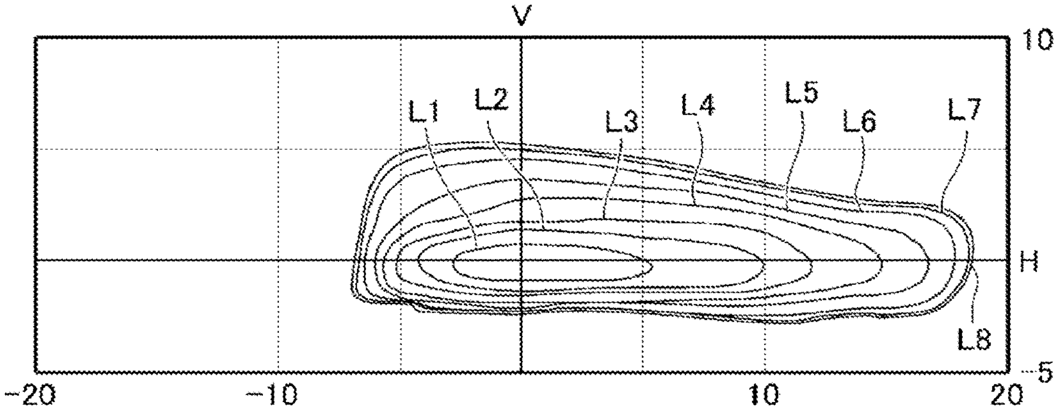
Figure 15B:
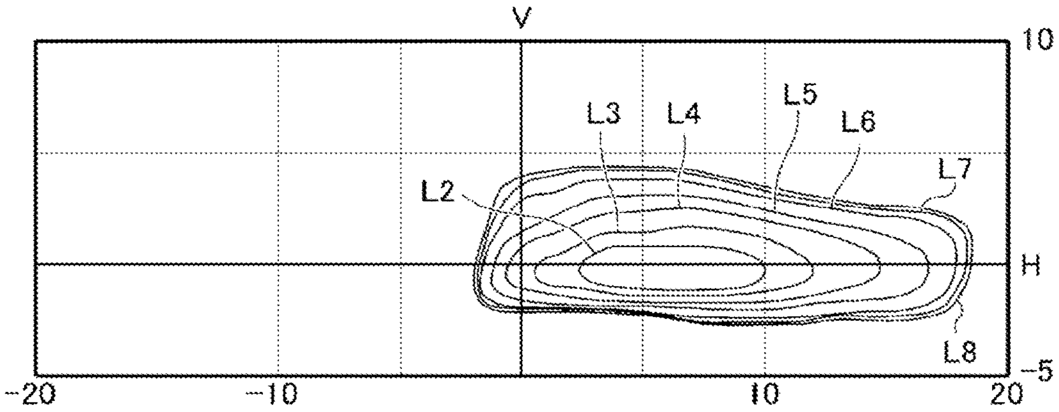
Figure 15C:
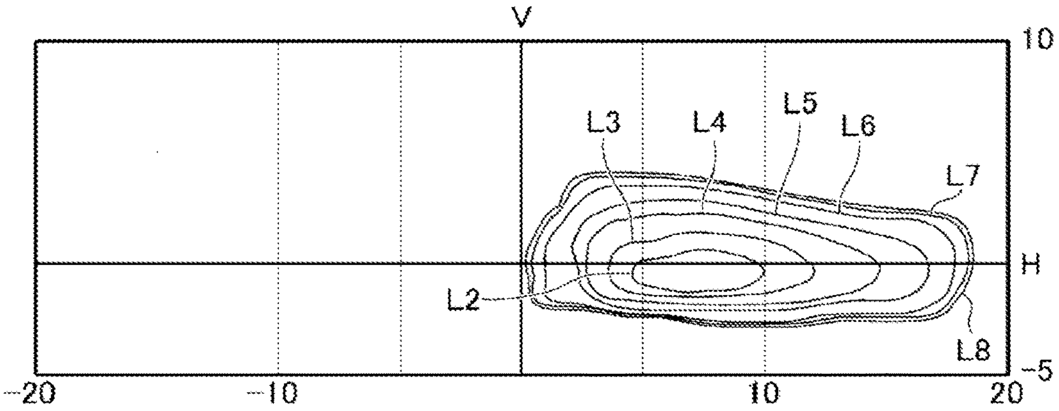
Figure 15D:
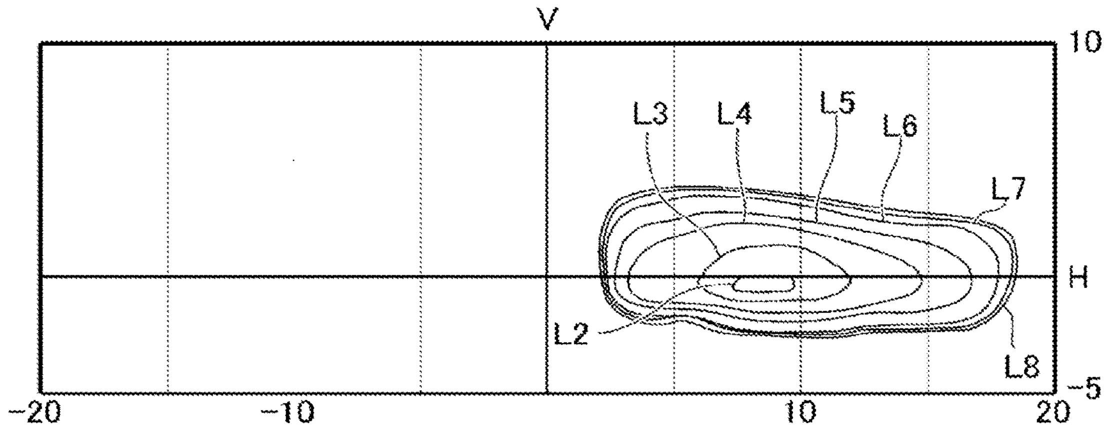
Figure 15E:
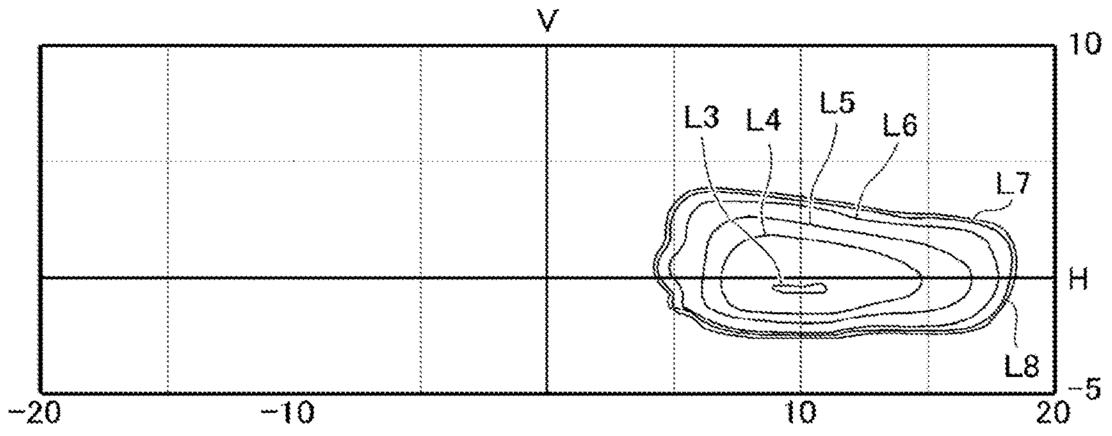

FIG. 15A illustrates a light distribution pattern in a case where all the light sources 31 to 36 are turned on, the light distribution pattern being corresponding to the normal pattern illustrated in FIG. 5. FIG. 15B illustrates a light distribution pattern in a case where the light sources 32 to 36 are turned on. FIG. 15C illustrates a light distribution pattern in a case where the light sources 32, and 34 to 36 are turned on. FIG. 15D illustrates a light distribution pattern in a case where the light sources 34 to 36 are tuned on. FIG. 15E illustrates a light distribution pattern in a case where the light sources 34 and 36 are turned on.

Thus, a reflector to be used among the four reflectors 21 to 24 (i.e., a light source to be turned on among the light sources 31 to 36) is changed, so that it is possible to realize various light distribution patterns.

Second Embodiment

Figure 16:
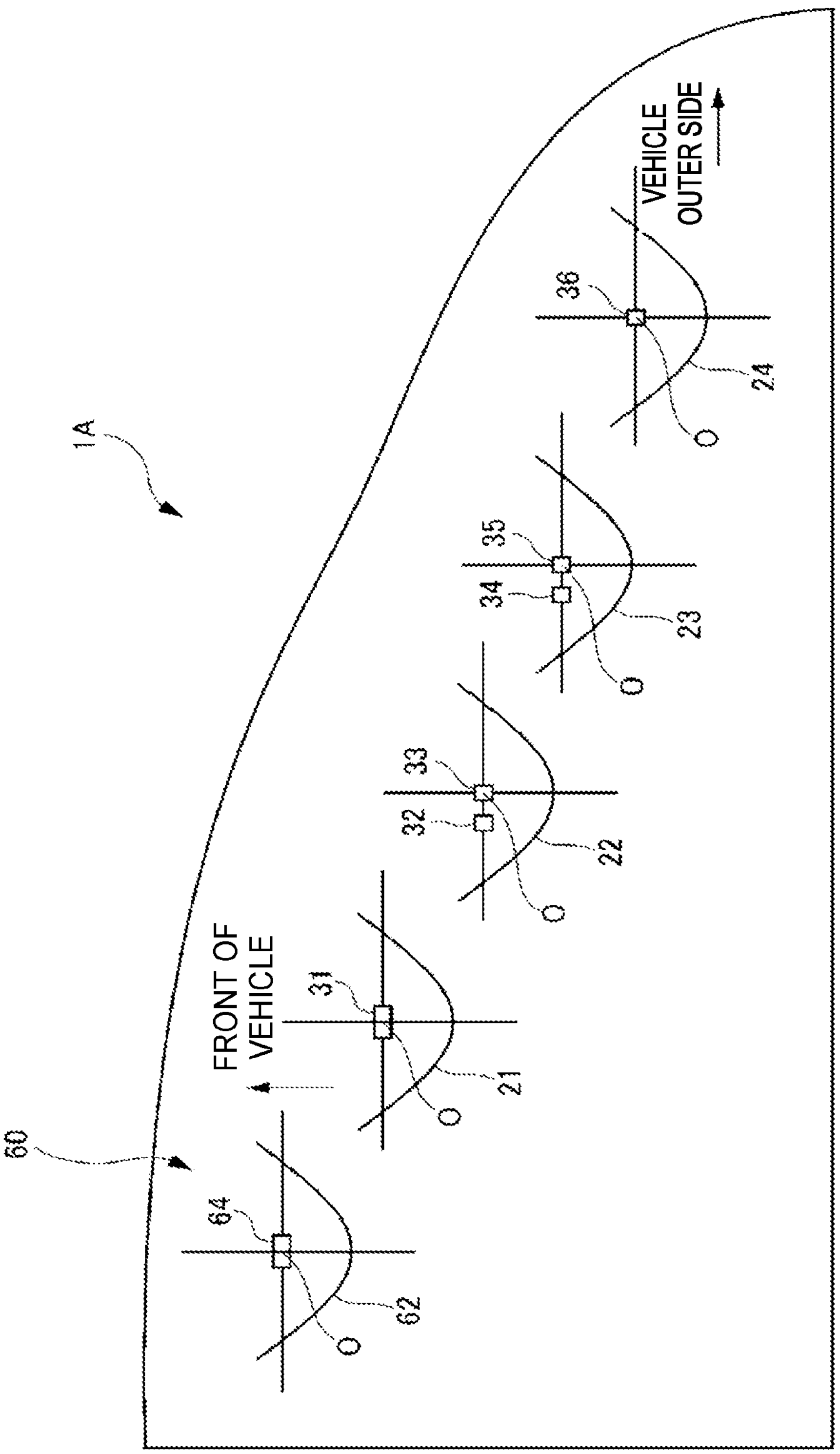
FIG. 16 is a top view illustrating relationship between reflectors and light sources of a lamp unit as a second embodiment.

FIG. 16 is a top view illustrating relationship between reflectors 21 to 24, and 62 and light sources 31 to 36, and 64 of a lamp unit 1A as a second embodiment. In FIG. 16 (as well as in FIG. 17 below), as in FIG. 3 above, the outline of the reflectors 21 to 24, and 62 is illustrated schematically, and focal points of the reflectors 21 to 24, and 64 are illustrated by respective intersections O of cross hairs.

The lamp unit 1A further includes a passing lamp unit 60 that forms a passing light distribution area in addition to the reflectors 21 to 24 and the light sources 31 to 36 according to the above first embodiment.

The passing lamp unit 60 is adjacent to the second reflector 21 in the vehicle width direction. In FIG. 16, the passing lamp unit 60 is provided on the vehicle inner side with respect to the second reflector 21. The passing lamp unit 60 includes the reflector 62 and the light source 64. For example, the light source 64 is disposed at the focal point of the reflector 62.

Figure 17:
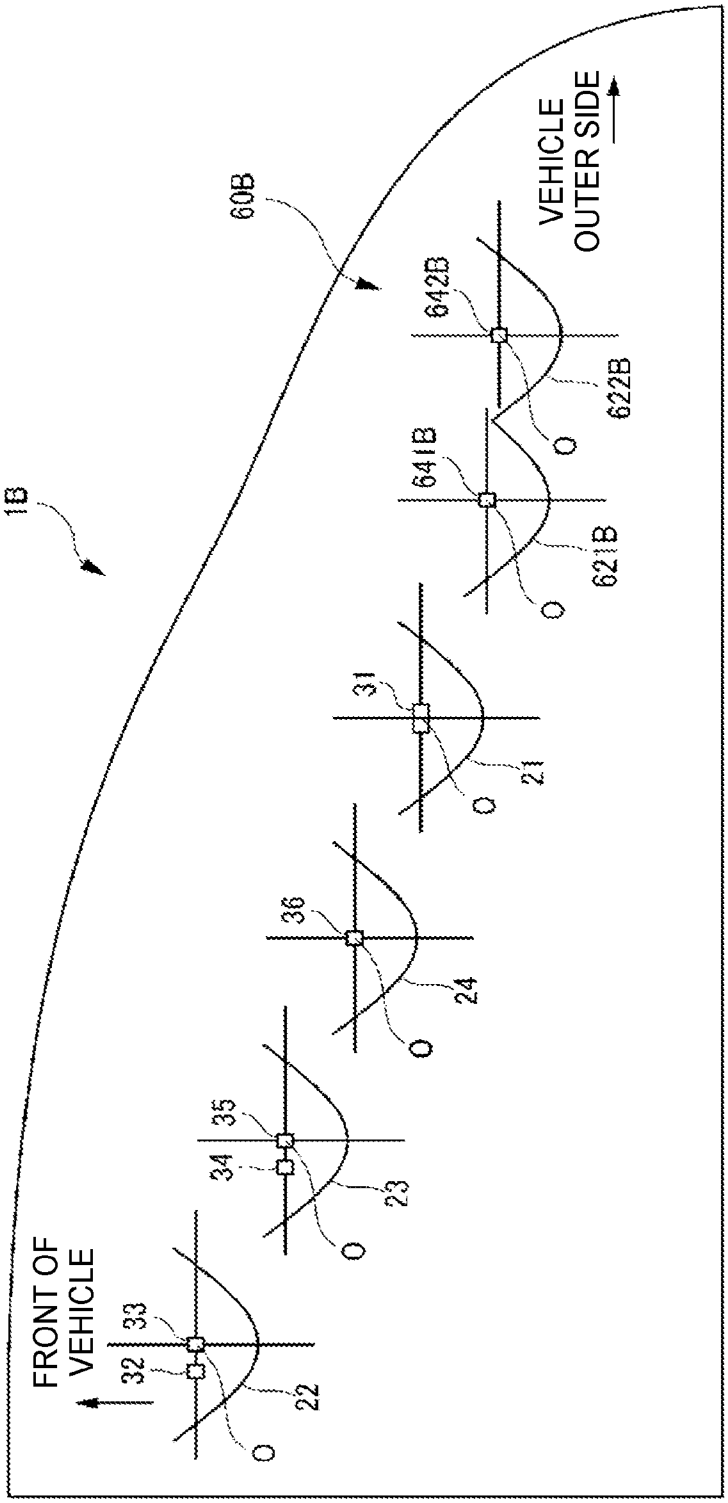
FIG. 17 is a top view illustrating relationship between reflectors and light sources of a lamp unit as a modification of the second embodiment.

FIG. 17 is a top view illustrating relationship between reflectors 21 to 24, 621B and 622B and light sources 31 to 36, 641B and 642B of a lamp unit 1B as a modification of the second embodiment.

The lamp unit 1B further includes a passing lamp unit 60B that forms a passing light distribution area in addition to the reflectors 21 to 24 and the light sources 31 to 36 according to the above first embodiment. However, in FIG. 17, the reflectors 21 to 24 and the light sources 31 to 36 according to the first embodiment described above 31 to 36 are disposed differently. Specifically, the second reflector 21 and the second light source 31 are disposed on the vehicle outer side with respect to the fourth reflector 24 and the fourth light source 36.

The passing lamp unit 60B is adjacent to the second reflector 21 in the vehicle width direction. In FIG. 17, the passing lamp unit 60B is provided on the vehicle outer side with respect to the second reflector 21. The passing lamp unit 60B includes the reflectors 621B and 622B, and the light sources 641B and 642B. For example, the light sources 641B and 642B are disposed at the respective focal points of the reflectors 621B and 622B.

Thus, the reflectors 21 to 24 and the light sources 31 to 36 of the lamp unit 1 according to the first embodiment described above can also be combined with the passing lamp unit in various manners. The second reflector 21 is adjacent to the passing lamp units 60 and 60B, so that the passing light distribution pattern and the light distribution pattern on the central side illustrated in FIG. 7 are precisely aligned to enable light distribution.

Although each embodiment is described in detail above, the present invention is not limited to a specific embodiment, and various variations and changes are possible within the scope of the claims. It is also possible to combine all or a plurality of the components of the aforementioned embodiments.

For example, in the embodiment described above, the four reflectors 21 to 24 are provided. However, as long as the number of the reflectors is two or more, any number of the reflectors can be employed. For example, among the four reflectors 21 to 24, the fourth reflector 24 (and, accordingly, the fourth light source 36) may be omitted. In place of or in addition to this, the third reflector 23 (and, accordingly, the third light sources 34 and 35) may be omitted. The arrangement of the four reflectors 21 to 24 is not limited to the arrangement illustrated in FIG. 3, and may be changed as appropriate (see FIG. 17).

In the above embodiments, the third reflector 23 is provided with the two third light sources 34 and 35. However, three or more light sources may be provided. This is also true for the first reflector 22.

In addition, in the embodiment described above, only the fourth light source 36 is provided in the fourth reflector 24. However, a further light source may be provided. In this case, the further light source may be provided on the vehicle inner side with respect to the fourth light source 36. Although only the second light source 31 is provided in the second reflector 21, a further light source may be provided.

DESCRIPTION OF REFERENCE NUMERALS

1 lamp unit
20 reflector assembly
21 second reflector
22 first reflector
23 third reflector
24 fourth reflector
31 second light source
32 first light source
33 first light source
34 third light source
35 third light source
36 fourth light source
40 control system
50 front camera
101L headlight
101R headlight
102 vehicle

400 microcomputer
401 drive circuit
402 drive circuit
403 drive circuit
404 drive circuit
405 drive circuit
406 drive circuit

The invention claimed is:

1. A vehicle lamp comprising:

a plurality of reflectors including a first reflector; and a plurality of light sources provided in the plurality of reflectors in a mode in which at least one of the plurality of light sources is provided in each of the plurality of reflectors, to form a light distribution pattern including a first pattern, the light distribution pattern being an adaptive driving beam or a high beam, and the first pattern being a pattern formed by driving the plurality of light sources provided in all of the plurality of reflectors, wherein the plurality of light sources include two or more first light sources provided in the first reflector, one of the two or more first light sources is disposed at a focal point of the first reflector, the other of the two or more first light sources is disposed on a vehicle inner side with respect to the focal point of the first reflector, and the one and the other of the two or more first light sources provided in the first reflector among the plurality of reflectors are arranged such that when the first pattern is to be formed, the other is driven to emit light having a lower luminous flux than the one of the two or more first light sources to suppress spread of the first pattern toward a vehicle outermost side; such that the first pattern comprises a width in a vertical direction that gradually decreases from the uppermost portion thereof along a direction toward the vehicle outermost side.

2. The vehicle lamp according to claim 1, wherein the plurality of reflectors further include a second reflector that forms a light distribution pattern closer to a center with respect to the first reflector, the plurality of light sources include two second light sources provided in the second reflector, and the two second light sources are disposed at a focal point of the second reflector in such a manner as to be adjacent to each other.

3. The vehicle lamp according to claim 2, wherein the plurality of reflectors further include a third reflector that irradiates an outermost area of the plurality of reflectors with light, the plurality of light sources include one third light source provided in the third reflector, and the one third light source emits light having a luminous flux equivalent to or lower than the luminous flux of the one of the two first light sources.

4. The vehicle lamp according to claim 2, further comprising a passing lamp unit that forms a passing light distribution area in addition to the plurality of reflectors and the plurality of light sources.

5. The vehicle lamp according to claim 4, wherein the second reflector is disposed adjacent to the passing lamp unit.

6. The vehicle lamp according to claim 1, wherein the plurality of reflectors form a traveling light distribution area.

* * * * *